3,781,282
CEPHALOSPORIN PROCESS AND PRODUCT
William L. Garbrecht, 4114 Ponderosa Blvd.,
Indianapolis, Ind. 46250
No Drawing. Filed Jan. 20, 1971, Ser. No. 108,218
Int. Cl. C07d 99/24
U.S. Cl. 260—243 C                            8 Claims

ABSTRACT OF THE DISCLOSURE

Cephalosporin esters are de-esterified by reduction in acid medium in DMF, the cephalosporin values are separated as a complex thereof with DMF, and if desired, the complex is purified by dissolution in an acidified DMF/polar solvent mixture, and precipitation therefrom with added base to pH 6.5 to 7.5. Cephalosporin antibiotic, e.g., cephalexin, can be recovered from purified cephalosporin·DMF complex by dissolution in acidified water, heating the solution to 40° to 70° C. to form the monohydrate, and treating the solution with base to raise the pH to the isoelectric point of the antibiotic in that solvent system. If unsolvated cephalosporin antibiotic is desired, the complex can be dissolved in aqueous acetonitrile with the aid of acid, and separated from that medium by adjusting the pH to the isoelectric point in that medium.

INTRODUCTION

This invention relates to processes for preparing cephalosporin substances. More particularly, this invention provides an improved process for de-esterifying cephalosporin esters, which process finds particular advantage and applicability in processes for removing p-nitrobenzyl or 2,2,2-trichloroethyl ester groups from cephalosporin compounds, e.g., in manufacturing processes for making cephalosporin antibiotics, in which process a p-nitrobenzyl or other acid-removable ester of a cephalosporin nucleus compound is prepared, the cephalosporin nucleus ester is acylated at the 7-amino position with the desired acylating form of the selected acid after which the ester group must be cleaved or removed to obtain the desired cephalosporin antibiotic compound.

BACKGROUND OF THE INVENTION

In the production of certain cephalosporanic acid derivative antibiotic compounds, process routes have been developed for acylating the 7-amino group of a cephalosporin nucleus ester with an acylating form of the desired acid. When the acylation step is completed, any protecting groups and the ester group must be removed from the cephalosporin derivative to obtain the desired cephalosporin antibiotic product. Often, the acylation and de-esterification steps are done in a single solvent system. For reasons of ease of handling of materials and for improved yields, in some cases it is preferred to use p-nitrobenzyl as the ester group on the cephalosporin nucleus compound in this process. For example, in such a process a p-nitrobenzyl ester of 7-aminodesacetoxycephalosporanic acid (7-ADCA), or a p-toluenesulfonate salt thereof, is prepared and used as the nucleus compound for preparing cephalexin, which antibiotic product is claimed in U.S. Pat. No. 3,507,861.

One method which is presently used to prepare cephalexin is to acylate a p-nitrobenzyl ester of 7-aminodesacetoxycephalosporanic acid (7-ADCA ester) in acetonitrile with a $C_1$ to $C_4$-alkyl mixed anhydride of phenylglycine in which glycine derivative, the amino nitrogen is protected with the enamine from methyl acetoacetate. Presently, the ester group is removed from the carboxyl by treating the acetonitrile mixture of the cephalexin ester with a reducing agent, e.g., metallic zinc dust and acid. This acid reduction step which also removes the enamine is then followed by base treatment to raise the pH of the mixture to about pH 4.5 to 5.0 at which pH crude cephalexin zwitterion precipitates. This prior method is disclosed in my prior application Ser. No. 808,-313, filed Mar. 8, 1969, now U.S. Pat. No. 3,632,850.

Although this acid reduction effectively cleaves the p-nitrobenzyl ester group, certain impurities which are difficult to remove from the cephalexin zwitterion product are also produced. Among such impurities are believed to be small amounts of 7-ADCA, phenylglycine and, when p-nitrobenzyl ester is used, an impurity, the structure of which is not yet established with certainty. Whatever its chemical structure, this latter impurity does contain diazotizable nitrogen as measured by the Bratton-Marshall method described hereinbelow. Those skilled in the cephalosporin antibiotic art would prefer to eliminate or at least to reduce the amount of the diazotizable nitrogen impurity to insignificant levels in the cephalexin product.

It is an object of this invention to provide an improved acid reduction cephalosporin ester cleavage process for use in the manufacture of cephalosporin type compounds, which are useful as antibiotics per se, or in processes for making antibiotics.

It is a further object of this invention to provide an improved process for removing a nitro-substituted benzyl ester group from cephalosporin compounds, which improved process provides more complete removal of diazotizable nitrogen impurities.

It is also an object of this invention to provide certain new cephalosporin complexes.

Some of the compounds used as reactants and some of the products prepared according to the process of this invention are named as derivatives of cephalosporanic acid which has the structure

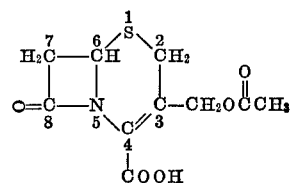

Thus, 7-aminocephalosporanic acid (7-ACA) has the structure

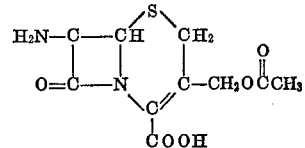

The 7-ACA is an important intermediate obtained from cephalosporin C

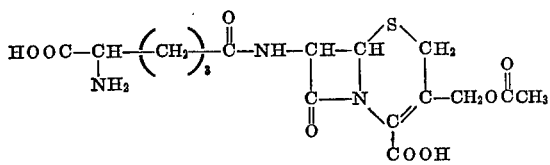

by cleaving the 7-acyl side chain by procedures now known. Other compounds used in and prepared by the process of this invention are named derivatives of 7-aminodesacetoxycephalosporanic acid (7-ADCA)

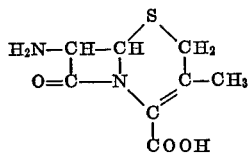

More complicated compounds are often named, for convenience, as derivatives of a "cephem" ring system. The "cepham" ring structure is defined in Journal of the American Chemical Society, 84, 3400 (1962) as having the structure

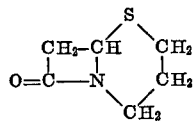

The term "cephem" refers to the cepham ring structure containing a double bond, the position of which is indicated by a prefix "Δ" with a superscript denoting the lowest numbered carbon atom to which the double bond is connected or by the word "delta" with the same number relationship. Sometimes the position of the double bond is indicated by a number immediately preceding the name "cephem." The various substituents on this ring system are then named. Thus, 7-aminodesacetoxycephalosporanic acid can be named by this nomenclature system as 7-amino-3-methyl-Δ³-cephem-4-carboxylic acid. Similarly, cephalexin can be named 7-[D-α-amino-α-phenylacetamido]-3-methyl-Δ³-cephen-4-carboxylic acid.

SUMMARY

In the process of this invention, a cephalosporin ester, containing a free amino group, or blocked amino group from which the blocking group is removed in an acid medium, as such or in salt form, is dissolved in N,N-dimethylformamide (DMF) or N,N-dimethylacetamide (DMAC), with the aid of acid, if necessary, and treated with the reducing agent and with acid to remove the ester group. Thereafter, after filtering if necessary, the mixture is treated with base to raise the pH to a level at which the cephalosporin acid complex with the dimethylformamide or dimethylacetamide precipitates.

The crude cephalosporin dimethylformamide or dimethylacetamide complex can be further purified, in accordance with this invention, by dissolving the complex in a mixture of the selected N,N-dialkylacylamide containing up to about 40 percent polar liquid diluent, by volume, by acidification, agitating, and then adding base to reprecipitate the purified cephalosporin acid solvent complex. The cephalosporin complex is converted to the free cephalosporin by dissolving the complex in acidified water; heating the solution at 40° to 70° C. and then adjusting the pH of the mixture to the range at which the cephalosporin precipitates from solution.

In a preferred embodiment of this invention a paranitrobenzyl cephalexin ester is commingled with N,N-dimethylformamide, treated with zinc and acid to cleave the ester group, the cephalexin containing solution is separated from by-products and zinc, the pH of the solution is adjusted to separate cephalexin, and the cephalexin is purified by dissolution in a DMF/polar liquid mixture followed by base treatment to separate new cephalexin·DMF complexes. The complexes, after purification from phenylglycine, 7-ADCA, and diazotizable amine impurities are dissolved in acidified water, warmed to 40° to 70° C., and treated with base to adjust the pH to the pH range at which cephalexin hydrate precipitates from the solution.

DETAILED DESCRIPTION OF THE INVENTION

This invention provides a method for substantially improving the yields of amino-group containing cephalosporin compounds while still simplifying the purification procedures and enhancing the purity of the cephalosporin products which are made by multiple step processes, which processes include steps for removing carboxyl protecting ester groups.

Cephalosporin esters which have the formula

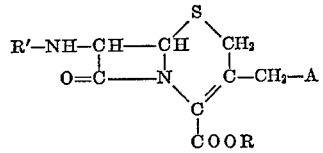

wherein R denotes the residue of an ester group which is removed by acid reduction conditions such as a nitrobenzyl, 2,2,2-trichloroethyl, phenacyl, and other similar ester groups known in the patent literature such as U.S. Pat. No. 3,284,451;

R' denotes hydrogen, $H_2^\oplus$ as part of a salt, or an amino-group containing acyl group of the formula

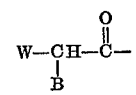

wherein

B is $-NH_2$, $-NH_3^\oplus$ when the cephalosporin ester is in salt form;

W is phenyl, 3-hydroxyphenyl, 4-hydroxyphenyl, 4-(α-amino-$C_1$ to $C_3$-alkyl)phenyl, 4-chlorophenyl, 3,5-dichloro-4-hydroxyphenyl, 3-chloro-4-hydroxyphenyl, 2-thienyl or 3-thienyl, or sydnone; and A denotes hydrogen —O—C(O)—($C_1$ to $C_4$)-alkyl, —O—C(O)—($C_4$ to $C_7$)-cycloalkyl, —X—Z wherein X is oxygen or sulfur and Z the residue of a thiol illustrated in prior art cephalosporin patents, e.g., U.S. Pat. No. 3,530,123, and is preferably $C_1$ to $C_4$ alkyl such as methyl, ethyl, propyl, isopropyl, butyl, isobutyl, tert.-butyl, a 1,3,4-thiadiazol-2-yl., or a 1-methyl-1H-tetrazol-5-yl., or the like, are typical intermediate cephalosporin ester compounds which are or can be used in the manufacture of cephalosporin antibiotics. Cephalosporin antibiotics obtainable from these esters are known in the patent literature.

Although the description of this invention will be written hereinbelow with particular reference to cephalexin since it is a commercial antibiotic, it will be understood that the described invention can be used in processes for preparing a variety of amino-group containing cephalosporin nucleus acid and cephalosporin antibiotic acid compounds from the corresponding cephalosporin esters, from which the ester group is removable by acid reduction conditions. For example, this invention can be applied in processes for making:

cephaloglycin [7-(D-α-aminophenylacetamido)cephalosporanic acid],

7-[D-α-amino-α-(2'-thienyl)acetamido]-3-methyl-Δ³-cephem-4-carboxylic acid,

7-[D-α-amino-α-phenylacetamido]-3-methylthiomethyl-Δ³-cephem-4-carboxylic acid,

7-[D-α-amino-α-phenylacetamido]-3-methoxymethyl-Δ³-cephem-4-carboxylic acid,

7-[D-α-amino-α-(3′-hydroxyphenyl)acetamido]-3-(1′-methyl-1H-tetrazol-5-ylthiomethyl]-Δ³-cephem-4-carboxylic acid, 7-[D-α-amino-α-(3′-hydroxyphenyl)-acetamido]-3-methylthiomethyl-Δ³-cephem-4-carboxylic acid, 7-[D-α-amino-α-(3′-hydroxyphenyl)-acetamido]-3-methoxymethyl-Δ³-cephem-4-carboxylic acid, 7-[D-α-amino-α-(4′-hydroxyphenyl)acetamido]cephalosporanic acid, 7-[D-α-amino-α-(4′-hydroxyphenyl)acetamido]-3-methyl-Δ³-cephem-4-carboxylic acid, 7-[D-α-amino-α-(4′-hydroxy-3′-chlorophenyl)acetamido-3-methyl-Δ³-cephem-4-carboxylic acid, 7-[D-α-amino-α-(4′-hydroxy-3′,5′-dichlorophenyl)acetamido]-3-methyl-Δ³-cephem-4-carboxylic acid, and the like.

This invention can also be used in processes for removing ester groups from cephalosporin nucleus compounds such as 7-aminocephalosporanic acid (7-ACA), 7-aminodesacetoxycephalosporanic acid (7-ADCA), 7-amino-3-$C_1$ to $C_4$-alkyl-S-methyl-Δ³-cephem-4-carboxylic acids, and 7-amino-3-$C_1$ to $C_4$-alkyl-O-methyl-Δ³-cephem-4-carboxylic acids.

By this invention I have discovered that the yields and purity of the amino-group containing cephalosporin compounds are improved by (a) commingling with N,N-dimethylformamide (DMF) or N,N-dimethylacetamide (DMAC) a cephalosporin ester of the above type, (b) treating the mixture from step (a) with a reducing agent in an acid (below pH 5) medium, and (c) commingling a basic (pH) substance with the resulting mixture from step (b) until a complex of the amino containing cephalosporin acid compound and the DMF or DMAC precipitates from the mixture. The amino cephalosporin DMF or DMAC complex can be separated from the mixture of step (c) by conventional methods and used as an intermediate for the recovery of the free cephalosporin zwitterionic compound. However, according to a further aspect of this invention, the amino cephalosporin acid/DMF or DMAC complex can be further purified by (d) dissolving the complex in a mixture of DMF or DMAC and up to about 40 percent by volume of a polar liquid diluent, and then commingling the mixture from step (e) with a basic substance to raise the pH until the cephalosporin complex precipitates. This purification step can be repeated one or more times until assays for unreacted reagents such as cephalosporin nucleus compound, or by-products such as impurities containing diazotizable nitrogen are reduced to an acceptably low level. The free cephalosporin zwitterion antibiotic can then be regenerated from the purified cephalosporin complex by dissolution thereof in water or aqueous acetonitrile, and adding a base to adjust the pH to the isoelectric point of the cephalosporin zwitterion in that mixture, at which point the cephalosporin zwitterion precipitates. The cephalosporin complexes can be converted to hydrated crystalline products if desired by dissolving the cephalosporin complex in acidified water, warming the solution to 40° to 70° C., and then commingling the solution with a basic substance until the cephalosporin zwitterion hydrate precipitates.

The process of this invention can be used as part of the overall process for preparing cephalexin and other primary amino cephalosporin antibiotics from penicillins but is not limited thereto. Generally, in that process, the penicillin is converted to a penicillin sulfoxide ester, this penicillin sulfoxide ester is heated in the presence of acid to form the corresponding 7-acylamidodesacetoxycephalosporin ester, the 7-acylamidodesacetoxycephalosporin ester is treated by known methods to cleave or remove the 7-acyl group which was derived from the penicillin and to form the 7-aminodesacetoxycephalosporanic acid ester (7–ADCA ester), which can be re-acylated with any desired acyl group in processes for preparing more potent cephalosporin antibiotics. This 7–ADCA ester in salt form is presently used in the manufacture of cephalexin. It can also be used in the improved process of this invention.

In the process of this invention, (1) The cephalosporin ester, e.g., the para-nitrobenzyl or 2,2,2-trichloroethyl ester of 7-aminodesacetoxycephalosporanic acid is acylated in acetonitrile with a mixed anhydride of phenylglycine, a substituted phenylglycine, 2-thienylglycine, or the like, in which the amino nitrogen of the glycine moiety is protected with the enamine from methyl acetoacetate, or other protecting group such as tert.-butoxycarbonyl;

(2) The product from step (1) is treated with an appropriate acid to precipitate the salt of the cephalosporin ester. A $C_6$ to $C_{12}$-aromatic hydrocarbon sulfonic acid, such a p-toluenesulfonic acid, is preferred for this purpose. In such acid treatment, the methyl acetoacetate enamine is removed from the amino nitrogen.

(3) The cephalosporin ester, or salt thereof from step (2), is separated from the acetonitrile medium, e.g., by filtering, centrifugation, or other conventional means.

(4) In accordance with this invention, the N-enamine blocked cephalosporin ester, or the cephalosporin ester salt is dissolved in N,N-dimethylformamide(DMF) or N,N-dimethylacetamide(DMAC) or solvent systems containing at least one of these compounds as a major component.

(5) The solution from step (4) is treated with a reducing agent, e.g., metallic zinc, finely divided for convenient handling. Alternatively, the reducing agent can be hydrogen under known hydrogenating reduction conditions in the presence of a hydrogenation catalyst such as palladium or rhodium on a carbon or barium sulfate support, or a palladium or rhodium compound suspended in the medium being hydrogenated. Any non-oxidizing acid can be used to provide the acid medium but hydrochloric acid is preferred. Such acid treatment also removes certain amino nitrogen protecting groups if such groups were not removed earlier in the process. The reaction is substantially completed in a short time but in practice the mixture is generally mixed or allowed to stand for a few hours to permit complete reaction, and to allow any residues and unreacted zinc to settle. The reaction mixture can then be separated from the residues by filtration, decantation, centrifugation or the like.

(6) The reaction mixture from step (5) is then treated with sufficient base to raise the pH to a level at which the cephalosporin precipitates as a complex with the DMF or DMAC solvent. When the preferred solvent, DMF, is used as the only solvent, cephalexin bis(DMF) complex precipitates at a pH of about 6.9. With DMF mixtures, the cephalosporin complex may precipitate at a pH from about 6.5 to 7.5. Any convenient base can be used to treat the reaction mixture. The choice will generally be dependent upon cost, availability and safety in handling. We prefer to use ammonia, ammonium hydroxide, or a N,N,N-tris($C_1$ to $C_4$-alkyl)amine such as triethylamine. However, the economical alkali metal hydroxides, e.g., sodium hydroxide, potassium hydroxide, could also be used.

The complexes, or solvates as they are termed by some persons, of cephalosporins with the DMF or DMAC, are new, crystalline substances which have all of the characteristics of chemical compounds. They give X-ray patterns which are characteristic of crystalline substances. For example, the cephalexin·bis(DMF) consistently assays as containing about 70 to 72 percent cephalexin and 28 to 30 percent of DMF by the ultraviolet spectral method, and is stable at room temperature. It can be dried at 30° to 50° C. to constant weight.

The product of this defined process, these cephalosporin solvent complexes with DMF or DMAC, can be further purified in accordance with this invention by dissolving them in an acidified mixture of the selected N,N-dialkylacylamide and up to about 40 percent by volume of a polar liquid diluent. With the preferred DMF, a preferred mixture is about 90 percent DMF and about 10 percent by volume of water. Other polar liquid diluents which can be used include $C_1$ to $C_3$-alkanols such as methanol, ethanol, isopropanol, and other compounds such as acetone, acetonitrile, nitromethane, methyl ethyl ketone and the like. Alternatively, the cephalosporin·DMF complex to be purified can be dissolved in the polar liquid with acid and the resulting solution can be treated with DMF or DMAC. Generally, non-oxidizing acid such as hydrochloric acid is added to assist the dissolution rate. An appropriate base such as ammonium hydroxide or triethylamine is added to raise the pH to the level at which the cephalosporin·solvate complex precipitates efficiently. With cephalexin·bis(DMF) a pH of about 6.5 to 7.5 is preferred. This purification procedure can be repeated one or more times until the cephalosporin·solvate complex assays desirably low for diazotizable nitrogen and any other undesired impurities such as 7 - aminodesacetoxycephalosporanic acid (7-ADCA). We prefer to repeat this procedure until the diazotizable nitrogen assays less than about 0.1 percent by the method described below.

The process and the cephalexin·bis [N,N-($C_1$ to $C_2$-alkyl)acylamide] complexes of this invention are useful for preparing cephalexin, a known antibiotic. For such purposes, the cephalexin bis(N,N-dialkylacylamide) is placed in water, acid is added to lower the pH to 1-2, the mixture is heated to 40° to 70° C., preferably 50° to 60° C. to form the monohydrate, and then a base, such as ammonium hydroxide or triethylamine is added to raise the pH to the point at which cephalexin zwitterion·monohydrate precipitates. Generally, this pH would be between about 4.5 and 5.0 but depends upon the solvent system used. If non-solvated cephalexin is desired, the complex can be dissolved in and recovered from an aqueous acetonitrile mixture. The cephalexin zwitterion can be recovered from the reaction mixture by conventional methods, washed with acetonitrile, dried, and then prepared into pharmaceutical formations for use in antibiotic therapy in combatting various infectious diseases. Particular formulations, capsule or tablet, sizes, and modes of administration of cephalosporin antibiotics such as cephalexin, cephaloglycin, and the like are now known in the art.

The present invention provides cephalexin manufacturing process improvements which allow the acylation and ester group removal steps to be separated and optimized independently. The new process produces a cephalexin product which is markedly superior in terms of freedom from zinc, phenylglycine, and 7-ADCA in earlier intermediate stages. This freedom from these impurities is advantageous because the yield and reliability of the final aqueous crystallization of cephalexin hydrate is improved. In addition, the process improvement of this invention provides a more complete recovery of the cephalexin values, the recoveries from DMF being of the order of 95–98 percent per reprecipitation.

The invention is further illustrated by the following detailed examples, which are not intended to be limiting of the scope of claimed invention.

EXAMPLE 1

Cleavage of p-nitrobenzyl ester

A mixture of 26.0 g. of the p-toluenesulfonate salt of the cephalexin ester, p-nitrobenzyl 3-methyl-7-(D-α-amino-α-phenylacetamido)-$\Delta^3$-cephem-4-carboxylate, 200 ml. of N,N-dimethylformamide(DMF), and 20.0 ml. of concentrated aqueous hydrochloric acid was stirred and kept at about 5° C. with external cooling while 10.4 g. of powdered zinc was added portionwise during 0.5 hour. The mixture was then stirred for 1 hour without further cooling and then kept at room temperature for several hours. After filtering, the cephalexin values in the filtrate were precipitated by gradually adjusting the apparent pH of the mixture to about 6.5 with triethylamine. The colorless, crystalline product, a bis(dimethylformamide) solvate of cephalexin, was collected, washed with DMF and then with ethyl acetate, and dried. The product weighed 16.5 g. and assayed as follows:

| | |
|---|---|
| Cephalexin (base) content, UV (264 m$\mu$) | 72.2 percent. |
| Diazotizable nitrogen (optical density method) | Approx. 2000 p.p.m. |
| Zinc, p.p.m. | 30 p.p.m. |
| Phenylglycine | 0.01 percent. |
| 7-ADCA | 0.13 percent. |

Purification of cephalexin·bis(DMF) solvate in DMF

A 16.0 gram portion of the cephalexin·2 DMF solvate product, prepared as described above, was dissolved in 160 ml. of a mixture of 95 percent DMF and 5 percent water by adjusting the apparent pH to about 2 with concentrated hydrochloric acid. The light yellow solution was filtered, and the filtrate was treated with triethylamine to pH 6.5 to precipitate the cephalexin·bis(DMF) solvate, as product. The product was collected, washed with DMF and ethyl acetate, and dried. The colorless crystalline product had a melting point of 183–186° C., and weighed 15.7 g., had a characteristic X-ray diffraction pattern and assayed as follows:

| | |
|---|---|
| Cephalexin (base), UV (264 m$\mu$) method | 72.0 percent. |
| Diazotizable amino nitrogen | Approx. 150 p.p.m. |
| Zinc | Not detectable. |
| Phenylglycine | Do. |
| 7-ADCA | Do. |

A second DMF dissolution with acid, followed by precipitation of the cephalexin·bis(DMF) solvate complex with triethylamine lowered the diazotizable nitrogen assay in the product to less than 50 parts per million.

EXAMPLE 2

To a 75 gallon, glass-lined vessel there was added 108 liters of N,N-dimethylformamide(DMF) chilled to −10° C. Then a one-half portion of 7.7 liters of reagent grade hydrochloric acid, and 10 kg. of the para-toluenesulfonate salt of the p-nitrobenzyl ester of cephalexin were added separately. Then the second one-half portion of the 7.7 liters of hydrochloric acid was added. To this mixture, 4.08 kg. of zinc dust was added over 40 minutes while keeping the mixture cooled to less than +12° C. Then 10.8 liters of hydrochloric acid was added over 30 minutes and the mixture was stirred overnight at +20° C. The mixture was filtered, approximately 800 gm. of residue and settled zinc dust was collected on a filter aid (Hyflo pad) in a Büchner funnel. The collected material was mostly a yellow residue and less than 20 gm. of zinc dust. The filtered material on the Büchner funnel was washed with 4 liters of DMF. The filtrate, containing the product, was treated with triethylamine to pH 6.9 to precipitate the cephalexin·bis(N,N-dimethylformamide). The precipitated product was filtered on a Büchner funnel, washed with three (15 liter) DMF washes, followed by two (15 liter) ethyl acetate displacement washes. The washed product was dried at 32° C. There was obtained 5.05 kg. of the cephalexin·bis(DMF) complex. Theory weight for pure cephalexin, based on the weight of the starting material was 4.695 kg. The actual yield was 77.5 percent. The cephalexin content by ultraviolet light (m$\mu$ 264) analysis was 72.0 percent. The diazotizable nitrogen content was about 2000 p.p.m. The 7-amino-desacetoxycephalosporanic acid (7-ADCA) content was 0.07 percent by weight. The product was gray in color.

EXAMPLE 3

The procedure of Example 2 was repeated on a 14.6 kg. scale (of the para-toluenesulfonate salt of the para-nitrobenzyl ester of cephalexin) except that the mixture was chilled to $-5°$ C. and the zinc dust was sprinkled into the reaction mixture over 35 minutes. The temperature was maintained below 12° C. A total of 5.34 kg. of zinc dust was used. After adding 14.13 liters of hydrochloric acid, warming to 22° C., the mixture was stirred overnight. The next day, the mixture was filtered. The residue was collected and washed with DMF (4 liters). The pH of the filtrate was adjusted to 5.2, and then 2 g. of the cephalexin·bis(DMF) complex was added as seed. The mixture was stirred 30 minutes. When the precipitated cephalexin·bis(DMF) crystals were of good filterable size, the pH of the slurry was adjusted to 6.0, the mixture was stirred for 15 minutes. The pH was adjusted to pH 6.9, the mixture was stirred for 15 minutes, and then filtered. The filtration time was 45 minutes. Adhering liquids were displaced with three (15 liter) DMF washes and two (15 liter) ethyl acetate washes. The crystalline cephalexin·bis(DMF) product was dried, and then weighed 7.568 kg. The product was white in color. The cephalexin base content by utlraviolet (264 m$\mu$) analysis was 71.7 percent. The theory weight of cephalexin in this disolvate product was 6.3 kg. The actual yield was 86.1 percent. The diazotizable nitrogen content was about 1000 p.p.m. The 7-ADCA content was 0.14 percent.

Another lot prepared in essentially the same manner resulted in a yield of 7.87 kg. (80.6 percent yield) of the white cephalexin·bis(DMF) solvate crystalline product, analyzing as containing 70.0 percent cephalexin, about 2000 p.p.m. diazotizable nitrogen, and 0.09 percent 7-ADCA.

From a fourth run on a similar scale, there was obtained 7.38 kg. (85 percent yield) of cephalexin·bis(DMF) crystalline product, assaying 71.4 percent cephalexin, about 1500 p.p.m. diazotizable nitrogen, and 0.09 percent 7-ADCA.

EXAMPLE 4

A mixture of four lots of the crude cephalexin·bis(DMF) solvates prepared as described in the above examples, a total of 19.4 kg. (of cephalexin zwitterion material) was dissolved in a mixture of 247 liters of DMF and 28 liters of distilled water. The pH was adjusted to 2.0 with food grade hydrochloric acid. The pH was then adjusted to pH 6.9 with ammonium hydroxide. The mixture was then filtered on two Büchner funnels and washed with two portions (18 liters per portion) of 100 percent DMF. After sampling (0.901 kg.), the remainder of the filtered, semi-purified cephalexin·bis(DMF) complex was redissolved in a mixture of 247 liters of DMF and 28 liters of water with the aid of hydrochloric acid. The pH was then adjusted to pH 6.9 with ammonium hydroxide. The mixture was then filtered to collect the product, cephalexin·bis(DMF) complex, on Büchner funnels. The product was washed twice with 15 liter portions of DMF and then twice with ethyl acetate (15 liters and 12 liters). The purified cephalexin·bis(DMF) complex was then dried. The total weight was 24.0 kg. plus 115 g. for samples. The cephalexin base content assayed 70.0 percent by the ultraviolet (264 m$\mu$) spectral method. The diazotizable nitrogen assayed about 300 p.p.m. The actual yield was 90.0 percent.

EXAMPLE 5

To a 75-gallon open glass-lined pot with a marine agitator, there was added 92 liters of distilled water, 6 kg. of reagent grade hydrochloric acid, 23 kg. of the cephalexin·bis(DMF) complex. This mixture was washed in with 11.5 liters of deionized water and then 0.640 kg. of sodium ethylenediaminetetraacetate in 5.5 liters of distilled water, and 1.67 kg. of charcoal (Darco G 60) were added and stirred for one hour. The solution was then filtered through a glass filter on a plate and frame press and washed with 15.3 liters of distilled water. The filtrate and wash waters were transferred to a 75-gallon still and heated to 55° C. The pH was adjusted to 4.5 with triethylamine. Some triethylamine excess collected around the agitator. This collection of excess amine was neutralized with 3.0 liters of hydrochloric acid. The maximum pH was 5.6 for less than 5 minutes. The mixture was filtered on a Büchner funnel, washed with 5 liters of water and two 15-liter deionized water washes. The filtrate (180 liters) was chilled and transferred to a 75-gallon still. Then 90 liters of acetonitrile was added to precipitate the second crop. Both products were air dried at 32° C. to constant weight. There was obtained as product 12.5 kg. of cephalexin monohydrate (93 percent cephalexin base) as measured by ultraviolet analysis (m$\mu$ 264). The diazotizable nitrogen content was less than 50 p.p.m. The DMF content was 0.0602 percent. The water content by the Karl Fischer analytical method was 6.25 percent.

EXAMPLE 6

The p-nitrobenzyl ester of 7-ADCA is acylated with a methyl mixed anhydride of D-2-amino-2-(2'-thienyl)acetic acid in which the amino group is protected or blocked with the enamine from methyl acetoacetate. The resulting mixture is treated with p-toluenesulfonic acid to remove the enamine and to precipitate the cephalosporin ester, p-nitrobenzyl 3-methyl-7-[D-2-amino-2-(2'-thienyl)acetamido]-$\Delta^3$-cephem-4-carboxylate.

This cephalosporin ester is dissolved in DMF with the aid of hydrochloric acid and treated with metallic zinc in an acid medium to remove the ester group. Ammonium hydroxide is added to raise the pH to precipitate the 3-methyl-7-[D - 2 - amino - 2 - (2'-thienyl)acetamido]-$\Delta^3$-cephem-4-carboxylic acid·bis(DMF) complex.

This complex is dissolved in acidified water (pH 1 to 2), heated to 50° to 60° C., and then treated with base to raise the pH until the 3-methyl-7-[D-2-amino-2-(2'-thienyl)acetamido]-$\Delta^3$-cephem - 4 - carboxylic acid zwitterion precipitates. This compound is separated from the reaction mixture, washed if desired, and dried. It is a known antibiotic, having been described, e.g., in U.S. Pat. No. 3,352,858.

EXAMPLE 7

To a solution of D-$\alpha$-(4'-hydroxyphenyl)-$\alpha$-(tert-butoxy-carbonylamino)acetic acid, 2,6-lutidine, in tetrahydrofuran there is added ethyl chloroformate to form a mixed anhydride in the manner described in Example 2 of U.S. Pat. 3,489,752. To this solution there is added the p-nitrobenzyl ester of 7-ADCA to form the p-nitrobenzyl 3-methyl-7-[D-$\alpha$-(4'-hydroxyphenyl)-$\alpha$-(tert - butoxycarbonylamino)acetamido]-$\Delta^3$ - cephem - 4 - carboxylate.

This ester is dissolved in DMF and treated as in Example 1 to remove the ester group and tert-butoxycarbonyl group and form 3-methyl-7-[D-$\alpha$-(4'-hydroxyphenyl)-$\alpha$-aminoacetamido]-$\Delta^3$-cephem-4-carboxylic acid and treated with base until the compound precipitates as its DMF complex. The complex is treated as in Example 5 to form the 3-methyl-7-[D-$\alpha$-(4'-hydroxyphenyl-$\alpha$-amino)acetamido]-$\Delta^3$-cephem-4-carboxylic acid.

In a similar manner, 3-methyl-7-[D-$\alpha$-amino-$\alpha$-(3',5'-dichloro - 4' - hydroxyphenyl)acetamido]-$\Delta^3$-cephem-4-carboxylic acid can be prepared by acylating the p-nitrobenzyl ester of 7-ADCA with the corresponding 2-(3',5'-dichloro-4'-hydroxyphenyl)-2-aminoacetic acid mixed anhydride having the amino nitrogen appropriately blocked, as described in U.S. Pat. No. 3,489,750, followed by the ester group removal process of this invention. Similarly, the compound 3-methyl-7-[D-α-amino-α-(3'-chloro-4'-hydroxyphenyl)acetamido]-Δ³-cephem - 4 - carboxylic acid (U.S. Pat. 3,489,751) can be prepared by acylating the p-nitrobenzyl 7-ADCA ester, then removing the ester acid amino-nitrogen protecting groups as described in this invention.

The analytical procedure for assaying for diazotizable amine in the cephalexin product is set forth below:

Diazotizable amine in cephalexin hydrate [1]

Chemical name: 7-(D-α-amino-α-phenylacetamido)-3-methyl-3-cephem-4-carboxylic acid
Generic name: Cephalexin
Type assay: Colorimetric
Assay use: Detect levels of diazotizable amine.

(I) Apparatus: Beckman Model DU spectrophotometer or other suitable spectrophotometer.
(II) Reagents:
    (1) Hydrochloric acid, 0.5 N
    (2) Sodium nitrate, 0.1 percent in $H_2O$
    (3) Ammonium sulfamate, 0.5 percent in $H_2O$
    (4) N-(1 - naphthyl)-ethylene diamine dihydrochloride, 0.1 percent in $H_2O$
(III) Procedure: Accurately weigh about 100 mg. of cephalexin sample into a 50 ml. Erlenmeyer flask. Add 3.0 ml. of $H_2O$ followed by 10.0 ml. of 0.5 N HCl. Add 2.0 ml. of 0.1 percent sodium nitrite, mix and allow to stand 3 minutes. Add 2.0 ml. of 0.5 percent ammonium sulfamate, mix and allow to stand 3 minutes. Add 2.0 ml. of 0.1 percent N-(1-naphthyl)-ethylene diamine dihydrochloride. Mix well and allow to stand 20 minutes. Determine the absorbance of this solution at 550 millimicrons on a suitable spectrophotometer using 1.0 cm. cells and $H_2O$ in the reference cell.
(IV) Results:

$$\text{Abs.}_{550 \, m\mu} \times \frac{100}{\text{spl. wt.}} = \text{Abs. per 100 mg. cephalexin}$$

(V) Remarks: The lower limit of this method is about 50 p.p.m.

This process can also be used to de-esterify other cephalosporin esters. Such cephalosporin esters may have been obtained by the penicillin sulfoxide ester expansion route disclosed in the Morin/Jackson U.S. Pat. No. 3,275,626, or from esterifying the selected cephalosporin nucleus acid compound. For example, this process can be used in processes for removing the 2,2,2-trichloroethyl ester group from 7-aminodesacetoxycephalosporanic acid, or from 2,2,2-trichloroethyl 7-[D-α-amino-α-phenylacetamido]-Δ³-cephem-4-carboxylate or a salt of such ester in a process for manufacturing cephalexin. This process can also be applied to the removal of ester groups with a reducing agent in an acid medium from any cephalosporin antibiotic ester derivative which is obtained by acylating a cephalosporin nucleus ester in the manner illustrated above. However, if a p-nitrobenzyl ester is not used, the need to assay the product for diazotizable nitrogen would be obviated, but this process is still especially effective for enhancing the yield of cephalosporin antibiotics and minimizing the occurrence of phenylglycine-type compounds, and unreacted cephalosporin nucleus acid, e.g., 7-ADCA, in the product. For example, in the re-precipitated cephalexin product prepared by procedures of this invention the 7-ADCA and phenylglycine content become so low as to be non-detectable by present analytical methods.

---

[1] This method is a slight modification of that described by A. C. Bratton and E. K. Marshall, Jr. in J. Biol. Chem., 128 (1939), pp. 537–550.

I claim:
1. A process for de-esterifying a cephalosporin ester of the formula

$$\text{R'-NH-CH-CH} \begin{array}{c} \diagdown \\ S \\ \diagup \end{array} \begin{array}{c} \diagup \\ \text{C} \\ \diagdown \end{array} \begin{array}{c} \text{CH}_2 \\ \\ \text{CH}_2\text{-A} \end{array}$$
$$\text{O=C—N}$$
$$\text{COOR}$$

which comprises
  (a) commingling the cephalosporin ester with dimethylformamide or N,N-dimethylacetamide;
  (b) reducing the cephalosporin ester in said amide mixture at a pH below pH 5 with a metallic reducing agent selected from the group consisting of zinc and a noble metal hydrogenation catalyst in the presence of hydrogen;
  (c) separating the reduction mixture from the insoluble metallic reducing agent;
  (d) adjusting the pH of the resulting mixture to a basic pH between approximately pH 6.5 and 7.5; and
  (e) recovering the cephalosporin acid in the form of a complex with dimethylformamide or N,N-dimethylacetamide;
    wherein R is the residue of an ester group which is removable under acidic reduction conditions; R' is hydrogen, $H_2^{\oplus}$ as part of a salt, or an acyl group of the formula $$\text{W-CH-C-} \\ \phantom{xx} | \\ \phantom{xx} \text{B} \\ \phantom{xxxx} \text{O}$$

wherein B is —$NH_2$, $NH_3^{\oplus}$, t-butyloxycarbamido or 1-methoxycarbonyl-2-propenyl;
    W is phenyl, 3-hydroxyphenyl, 4-hydroxyphenyl, 4-(α-amino-$C_1$ to $C_3$-alkyl)phenyl, 4-chlorophenyl, 3,5 - dichloro-4-hydroxyphenyl, 3-chloro-4-hydroxyphenyl, 2-thienyl, 3-thienyl, or sydnone; and
    A is hydrogen, $$-O-\overset{O}{\underset{\|}{C}}-(C_1-C_4\text{alkyl}), \quad -O-\overset{O}{\underset{\|}{C}}-(C_4-C_7 \text{ cycloalkyl}),$$

a group of the formula

—X—Z wherein X is oxygen or sulfur and Z is $C_1$–$C_4$ alkyl and a 1,3,4-thiadiazol-2-yl group or a 1-methyl-1H-tetrazol-5-yl group when X is sulfur.

2. The process of claim 1 wherein
W is phenyl, 3 - hydroxyphenyl, 4 - hydroxyphenyl, 3-chloro-4-hydroxyphenyl, 3,5 - dichloro-4-hydroxyphenyl or 2'-thienyl; and
A is hydrogen, acetoxy, methoxy, or methylthio.

3. A process as defined in claim 1 which further includes the steps of
  (f) dissolving the complex of the cephalosporin acid and the N,N-dimethylformamide or the N,N-dimethylacetamide in a N,N-dimethylformamide medium, and
  (g) commingling the mixture from step (f) with a basic substance to raise the pH until a complex of the cephalosporin acid and the N,N-dimethylformamide or the N,N-dimethylacetamide precipitates.

4. A process as defined in claim 1 or 2, which further includes the steps of
  (a) dissolving the complex of the cephalosporin acid and N,N-dimethylformamide or N,N-dimethylacetamide in acidified water, (b) warming the solution from step (a) to 40° to 70° C., and (c) commingling a basic substance with the solution from step (b) until the cephalosporin zwitterion precipitates.

5. A process as defined in claim 2 wherein the cephalosporin ester is p-nitrobenzyl 7-[D-α-amino-α-phenylacetamido]-Δ³-cephem-4-carboxylate.

6. A process as defined in claim 2 wherein the cephalosporin ester is 2,2,2-trichloroethyl 3-methyl-7-[D-α-amino-α-phenylacetamido]-Δ³-cephem-4-carboxylate.

7. The bis complex of cephalexin with N,N-dimethylformamide or N,N-dimethylacetamide.

8. A complex as defined in claim 7 wherein the complex is cephalexin·bis(N,N-dimethylformamide).

References Cited
UNITED STATES PATENTS 3,532,694   10/1970   Somerfield et al. __ 260—243 C NICHOLAS S. RIZZO, Primary Examiner U.S. Cl. X.R.

424—246